United States Patent
Takeuchi (10) Patent No.: US 7,054,709 B2
(45) Date of Patent: May 30, 2006

(54) EMBROIDERY SIMULATION METHOD AND APPARATUS AND PROGRAM AND RECORDING MEDIUM

(75) Inventor: Nobuyuki Takeuchi, Wakayama (JP)

(73) Assignee: Shima Seiki Manufacturing Limited, Wakayama (JP)

( * ) Notice: Subject to any disclaimer, the term of this patent is extended or adjusted under 35 U.S.C. 154(b) by 0 days.

(21) Appl. No.: 10/510,810

(22) PCT Filed: Mar. 17, 2003

(86) PCT No.: PCT/JP03/03192

§ 371 (c)(1),
(2), (4) Date: Oct. 12, 2004

(87) PCT Pub. No.: WO03/085186

PCT Pub. Date: Oct. 16, 2003

(65) Prior Publication Data

US 2005/0149223 A1    Jul. 7, 2005

(30) Foreign Application Priority Data

Apr. 11, 2002  (JP) .............................. 2002-108875

(51) Int. Cl.
*D05C 5/02* (2006.01)
(52) U.S. Cl. ................................. 700/138
(58) Field of Classification Search ................ 700/138, 700/136, 137; 112/102.5, 470.06, 475.19
See application file for complete search history.

(56) References Cited

U.S. PATENT DOCUMENTS 6,629,015 B1 *   9/2003   Yamada ...................... 700/138

FOREIGN PATENT DOCUMENTS

| JP | 3-27948 B2 | 4/1991 |
|---|---|---|
| JP | 6-236446 A | 8/1994 |
| JP | 7-73340 A | 3/1995 |
| JP | 2-596093 B2 | 1/1997 |
| JP | 2596093 B2 | 1/1997 |

OTHER PUBLICATIONS

Sonoe Takigami et al., "Illustrator 8 & Free Hand 8-Draw Graphic no Kyoen", MdN, vol. 60, Apr. 1, 1999, vol. 60, p. 63.
Ken'ichi Ota et al., "Ito Hyomen Data Base o Mochiita Orimono Hyomen Pattern Simulation", Sen'i Kikai Gakkaishi, 1990.12, vol. 43. Mp/ 12, p. T111-T119.

* cited by examiner

*Primary Examiner*—John J. Calvert
*Assistant Examiner*—Brian Kauffman
(74) *Attorney, Agent, or Firm*—Harness, Dickey & Pierce, P.L.C.

(57) ABSTRACT

A method for realizing embroidery simulation which can be used as an alternative sample to an actual object. A shade is added to a stitch not to brighten the center of the stitch and to darken the opposite ends thereof as shown at (a) but to brighten a stitch A close to a light source most and to darken a stitch B remote from the light source most as shown at (b). Assuming that the light source is not located on a two-dimensional plane where the stitch exists but a light beam enters obliquely from the upper space, variation of shade is also added in the widthwise direction of a yarn similarly to the longitudinal direction thereof in order to impart three-dimensional feeling thus attaining a simulation image having highly massive feeling.

11 Claims, 10 Drawing Sheets

EMBROIDERY SIMULATION METHOD AND APPARATUS AND PROGRAM AND RECORDING MEDIUM

This application is the national phase under 35 U.S.C. §371 of PCT International Application No. PCT/JP03/03192 which has an International filing date of Mar. 17, 2003, which designated the United States of America and which claims priority on Japanese Patent Application No. JP 2002-108875 filed Apr. 11, 2002, the entire contents of which are hereby incorporated herein by reference.

FIELD OF THE INVENTION

The present invention relates to a method, an apparatus, a program and a storage medium for an embroidering simulation with which a completed state of embroidery can be confirmed with images.

BACKGROUND OF THE INVENTION

Conventionally, an automated embroidering machine is used for mechanical embroidery. Japanese Patent No.2596093 discloses an embroidering simulation apparatus that displays a stitch image according to embroidering data to form an embroidery pattern, and that changes brightness of the stitch image of a thread that connects embroidering points, between embroidering points so as to make the stitches brighter at the central portion thereof than at both the end portions. It is also described that stitches can be displayed one by one with a slightly different brightness, and a stitch direction can be shown without giving a sense of incongruity, by adding a predetermined noise that differs from a stitch datum to a stitch datum so that the stitch direction is seen after the display.

Microscopically, embroidery has a stereoscopic structure that puts a thread on the surface of cloth as a stitch. Microscopically, embroidery has a characteristic texture obtained by assembling stitches that form a pattern as a flat image. Japanese Patent No.2596093 uses a method of showing the central portion of a stitch image between embroidering points brighter than the end portions thereof in order to improve the texture of the completed embroidery. However, even when carrying out an embroidering simulation with this method, the obtained stereoscopic image or texture is not always satisfactory, so that the simulation image does not have a quality that can be used as a sample that can be substituted for a real material.

SUMMARY OF THE INVENTION

An object of the invention is to provide a method, an apparatus, a program and a storage medium for an embroidering simulation that can be used as a sample as a substitute for a real material.

The invention is an embroidering simulation method including inputting embroidering data for embroidery and outputting an image of completed embroidery, comprising setting a plurality of positions of embroidering points on a two-dimensional plane based on the embroidering data, forming a plurality of stitches between the positions of embroidering points with two-dimensional images of threads, setting a light projecting direction to one direction on the two-dimensional plane, and adding brightness contrast to each of the thread stitch images so that an end portion at one side of the thread stitch image facing the light projecting direction is bright, another end portion at the other side thereof is dark, a change at the central portion of the thread stitch images is bigger than a change at both sides thereof and overall brightness is increased in accordance with an angle formed between a thread direction of the stitch and the light projecting direction within a range where the angle increases from 0 degree to 90 degrees.

The invention is an embroidering simulation apparatus in which embroidering data for embroidery is inputted and an image of completed embroidery is outputted, comprising embroidering point setting means for setting a plurality of positions of embroidering points on a two-dimensional plane based on the embroidering data, stitch forming means for forming a plurality of stitches with two-dimensional images of threads based on the embroidering data so that the stitches are formed between the positions of embroidering points, light setting means for setting a light projecting direction to one direction on the two-dimensional plane, and brightness contrast adding means for adding brightness contrast to each of the thread stitch images so that an end portion at one side of the thread stitch image facing the light projecting direction is bright, another end portion at the other side thereof is dark, a change at the central portion of the thread stitch images is bigger than a change at both sides thereof and overall brightness is increased in accordance with an angle formed between a thread direction and the light projecting direction within a range where the angle increases from 0 degree to 90 degrees.

In the invention, the brightness contrast adding means adds the brightness contrast to each of the thread stitch images in accordance with the light projecting direction both in the longitudinal direction and in the width direction.

In the invention, the stitch forming means includes thread image storing means for storing image data of threads that have been acquired in advance, and thread image circulation means for assigning the image data by circulation such that the image data of threads stored by the thread image storing means is assigned sequentially to each stitch by a length of the thread of the stitch, and when the image data of a thread to be assigned reaches a termination end of the length, then assignment is started again by returning to a front end portion of the length.

Furthermore, the invention is a program that let a computer function as any of the embroidering simulation apparatuses described above.

Furthermore, the invention is a computer-readable storage medium on which a program to be read by a computer to let the computer function as any of the embroidering simulation apparatuses described above is stored.

BRIEF DESCRIPTION OF THE DRAWINGS

Other and further objects, features, and advantages of the invention will be more explicit from the following detailed description taken with reference to the drawings wherein.

DETAILED DESCRIPTION OF THE EXEMPLARY EMBODIMENTS

Now referring to the drawings, preferred embodiments of the invention are described below.

Figure 1:
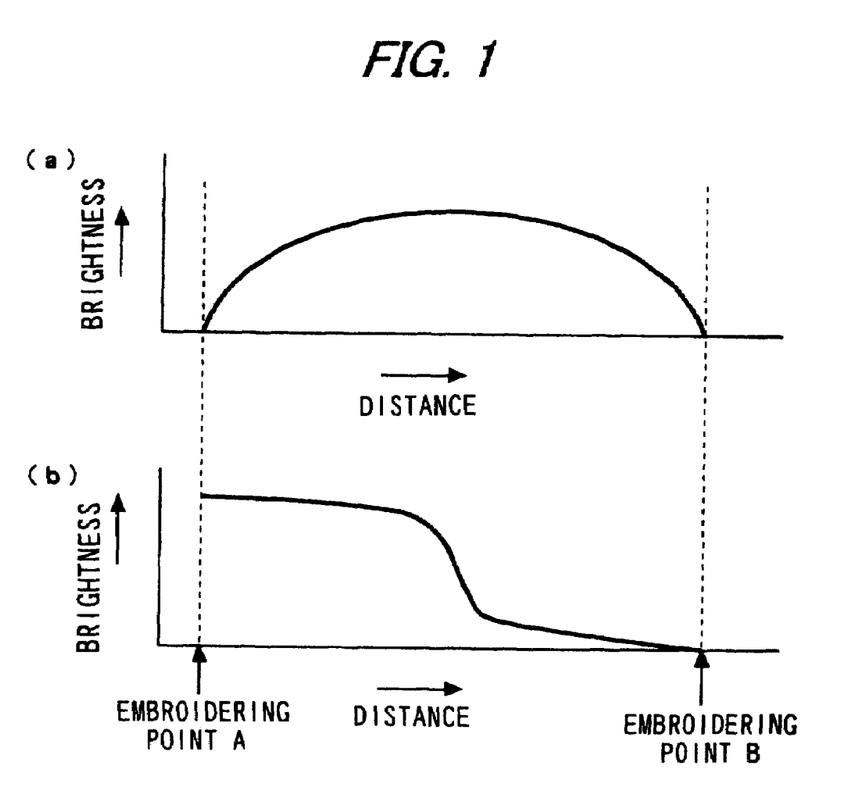
FIG. 1 shows graphs illustrating basic concepts to add the brightness contrast to a stitch according to the invention, compared with a related art.

FIG. 1 shows basic concepts of an embroidering simulation according to the invention, compared with basic concepts disclosed in Japanese Patent No.2596093. FIG. 1(a) shows a brightness change at a stitch between embroidering points disclosed in Japanese Patent No.2596093. FIG. 1(b) shows a brightness change at a stitch between embroidering points according to the invention. In both the concepts, a plurality of positions of embroidering points are set on a two-dimensional plane based on embroidering data, and a stitch is formed between the positions of embroidering points based on the embroidering data.

In Japanese Patent No.2596093, the brightness change is set such that end portions of the region between the embroidering points, that is, embroidering point portions are dark, and that the central portion is bright. In the invention, a light projecting direction is set to one direction on the two-dimensional plane on which stitches are formed, and the thread stitch images are bright at one end portion at the side thereof facing the light projecting direction, and dark at the end portion at the other side. That is, in FIG. 1(b), the light projecting direction is set from left to right, and a embroidering point A on the left is made bright, and a embroidering point B on the right is made dark. The embroidering point A is an end portion that is near to a light source, and that is facing the light projecting direction. The embroidering point B is an end portion that is away from the light source, and that is opposite to the end portion facing the light projecting direction.

In the invention, within a range where the angle formed between a thread direction of the stitch and the light projecting direction increases from 0 degree to 90 degrees, the brightness contrast is added so that the overall brightness is increased in accordance with the angle. Because of this configuration, a simulation can provide a more stereoscopic image, and a better texture.

Figure 2:
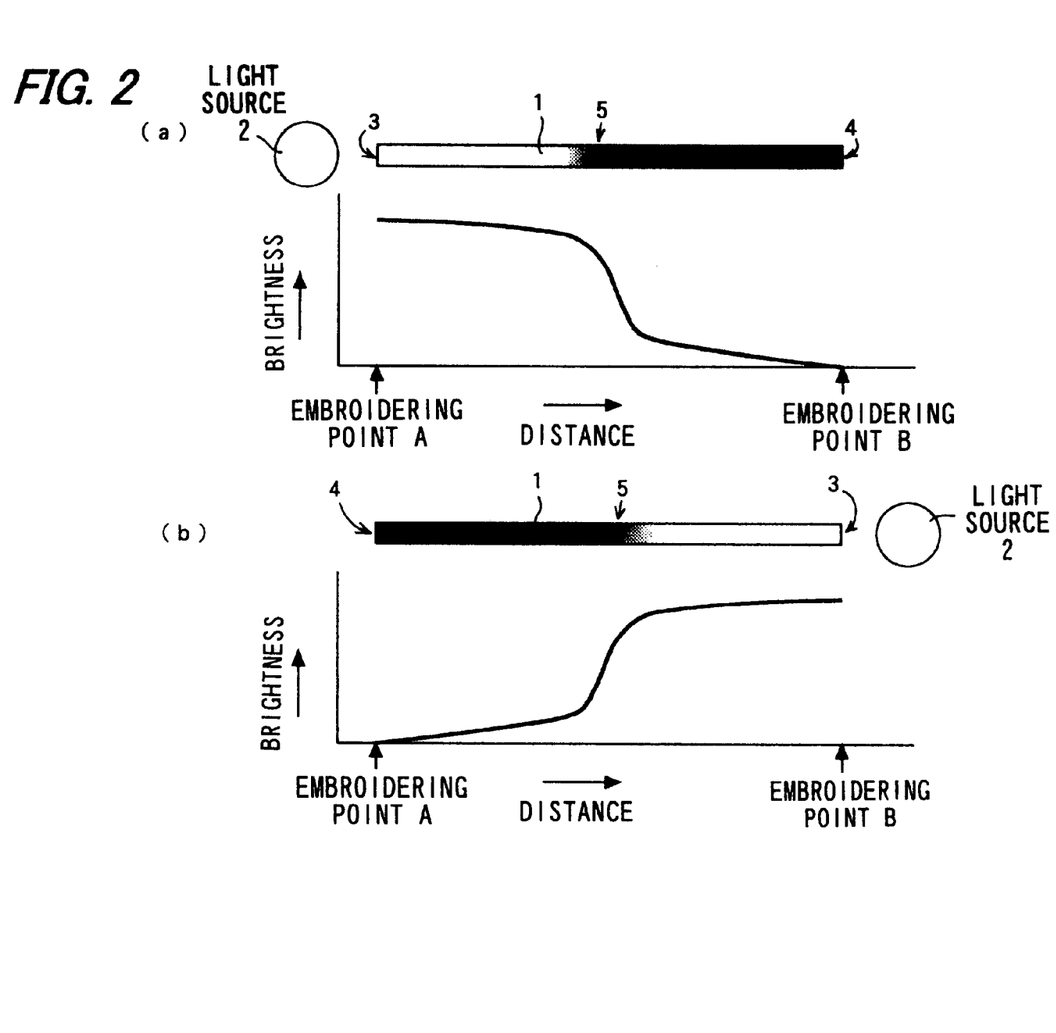
FIG. 2 shows diagrams and graphs illustrating a change of the brightness contrast to be added to the stitch, depending on a light source direction according to the invention.
Figure 3:
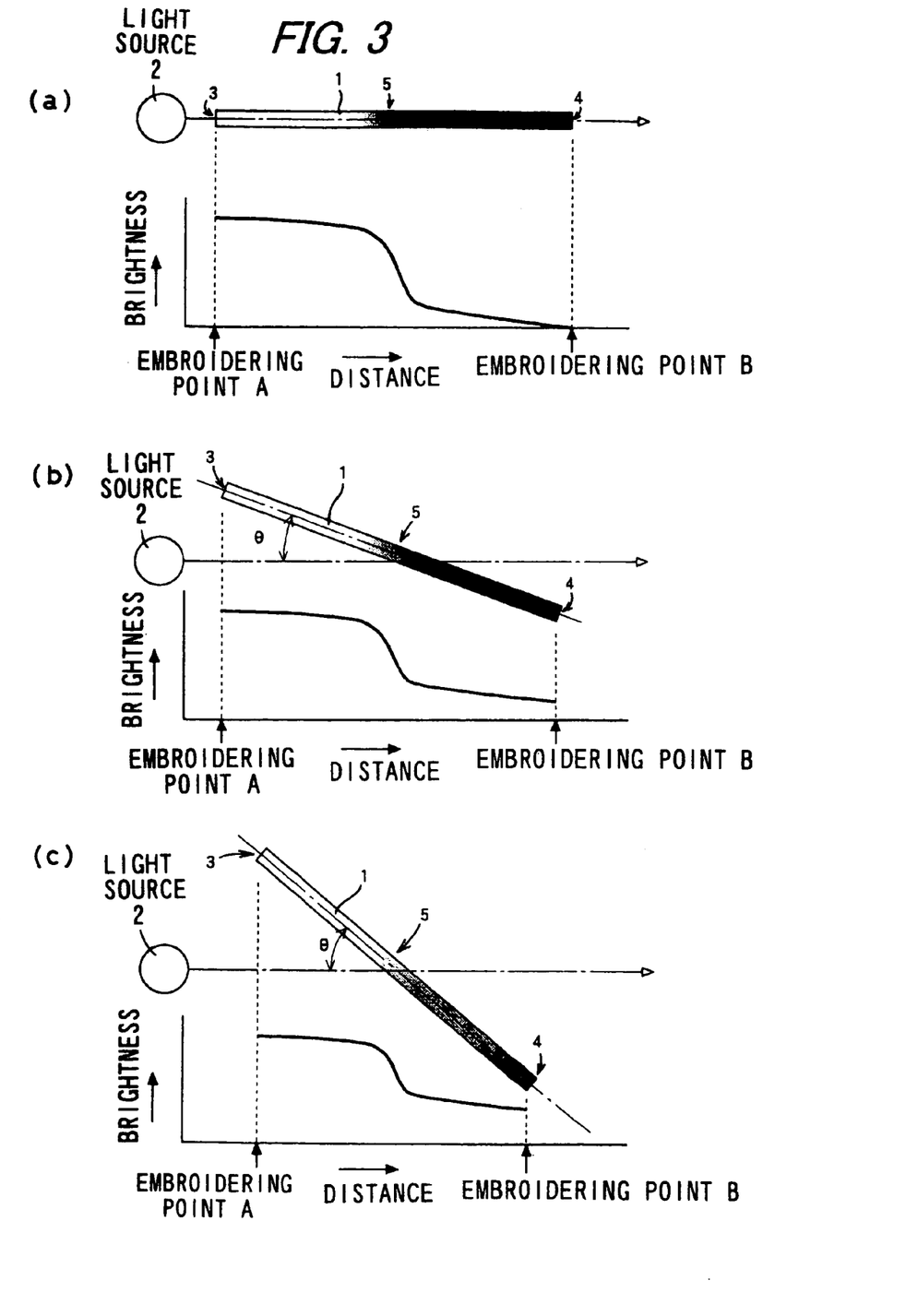
FIG. 3 shows diagrams and graphs illustrating a change of the brightness contrast to be added to the stitch, in accordance with the angle formed between a light projecting direction and a stitch direction according to the invention.

FIG. 2 and FIG. 3 show states where the direction of the brightness change differs in accordance with the light projecting direction. FIG. 2 shows the changes that a stitch 1 is made bright at an end portion 3 that is near to a light source 2, and dark at an end portion 4 that is away from the light source 2. The light source 2 is positioned at the left side of the stitch 1 in FIG. 2(a), and at the right side of the stitch 1 in FIG. 2(b), and thus the brightness changes become opposite, when the directions of the light source 2 are opposite. At a central portion 5 of the stitch 1, the brightness sharply changes. In order to simplify the process, the light source 2 is arranged to be adequately away, and light is projected in the form of parallel rays. The light source 2 projects light not from the plane where the stitch 1 is present, but from a high position in a three-dimensional space. The brightness change at an image of a thread of the stitch 1 depends on the height of the light source 2. The height of the light source 2 can correspond to the angle of elevation of the light projecting direction with relative to the two-dimensional plane on which the stitch 1 is present. When light whose angle of elevation is near to 90 degrees is projected from above, the overall brightness change is set to be small. When light whose angle of elevation is near to 0 degree is projected from the side, the overall brightness change is set to be large. Such a variation of the height of the light source 2 is reflected on a profile of the brightness change, so that image processing can be carried out with a small amount of calculation, as two-dimensional processing.

In this embodiment, a portion where the brightness decreases sharply from one embroidering point to the other embroidering point is provided in the central portion. It is confirmed that there are times that this sharply changing part provides a realistic stereoscopic image.

FIG. 3 shows states where the overall brightness is increased in accordance with the angle formed between the thread direction of the stitch 1 and the projection in the light projecting direction, as the angle θ increases from 0 degree to 90 degrees, on a virtual two-dimensional plane on which the stitch 1 is present. FIG. 3(a) shows a state where the angle θ=0 degree is satisfied, that is, the orientation of the stitch 1 is along with the light projecting direction from the light source 2. FIG. 3(b) shows a state where 0 degree<the angle θ<90 degrees is satisfied, and where the brightness is increased in the entire portion than the state where the angle θ=0 degree. FIG. 3(c) shows a state where the angle θ is greater than that in FIG. 3(b), and where the brightness is further increased. When the angle θ=90 degrees, the brightness is uniform in the entire portion. As described above, the brightness at the end portion 3 that is near to the light source 2 is set so that the brightness does not change with the angle, and the brightness at the end portion 4 that is away from the light source 2 is set so as to be the darkest with the angle of 0 degree, and be brighter as the angle becomes nearer to 90 degrees. As the end portion 4 that is away from the light source 2 becomes brighter, an in-between area up to the end portion 3 that is near to the light source 2 becomes brighter overall.

In the graphs shown in FIG. 1, FIG. 2, and FIG. 3, for ease of understanding, when the stitch orientation agrees with the projecting direction of the light from the light source, the brightness at the end portion that is away from the light source is set to be 0. However this brightness does not have to be 0. Furthermore, the brightness contrast is added so that the brightness change becomes sharp in the middle portion. However, it is not necessarily preferable that the brightness change becomes sharp in the middle portion, depending on the features of a display apparatus or a printer that output an simulation image, or the width and a texture of a thread for simulation. The brightness may change overall, or may sharply change at the end portion.

Figure 4:
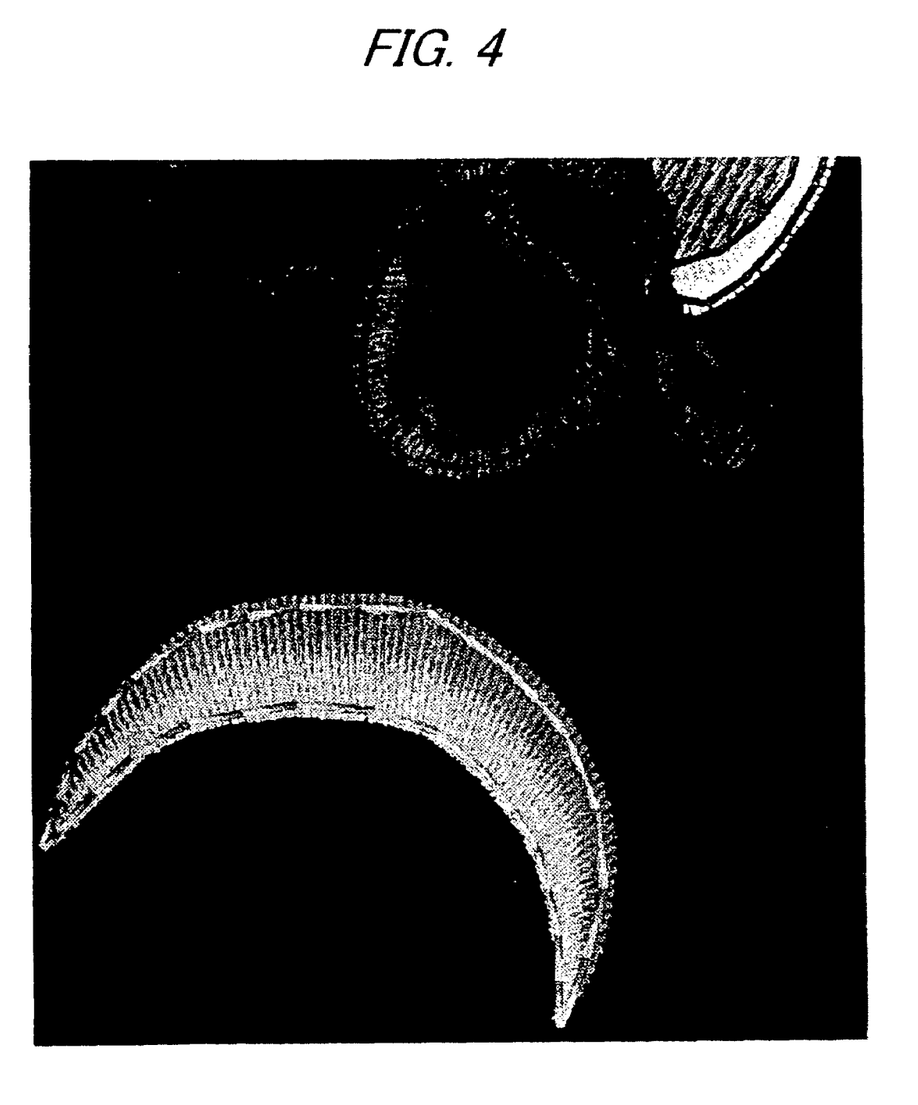
FIG. 4 shows an embroidering simulation image created according to the invention.
Figure 5:
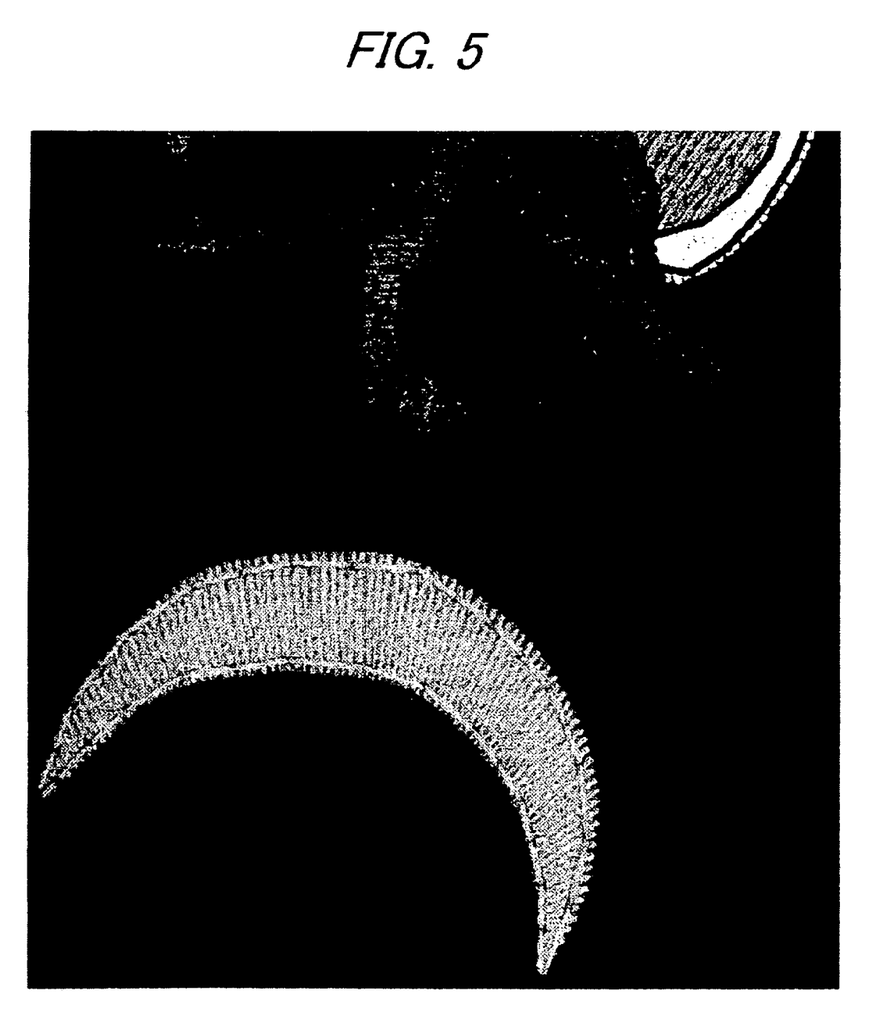
FIG. 5 shows an embroidering simulation image created according to a related art.
Figure 6:
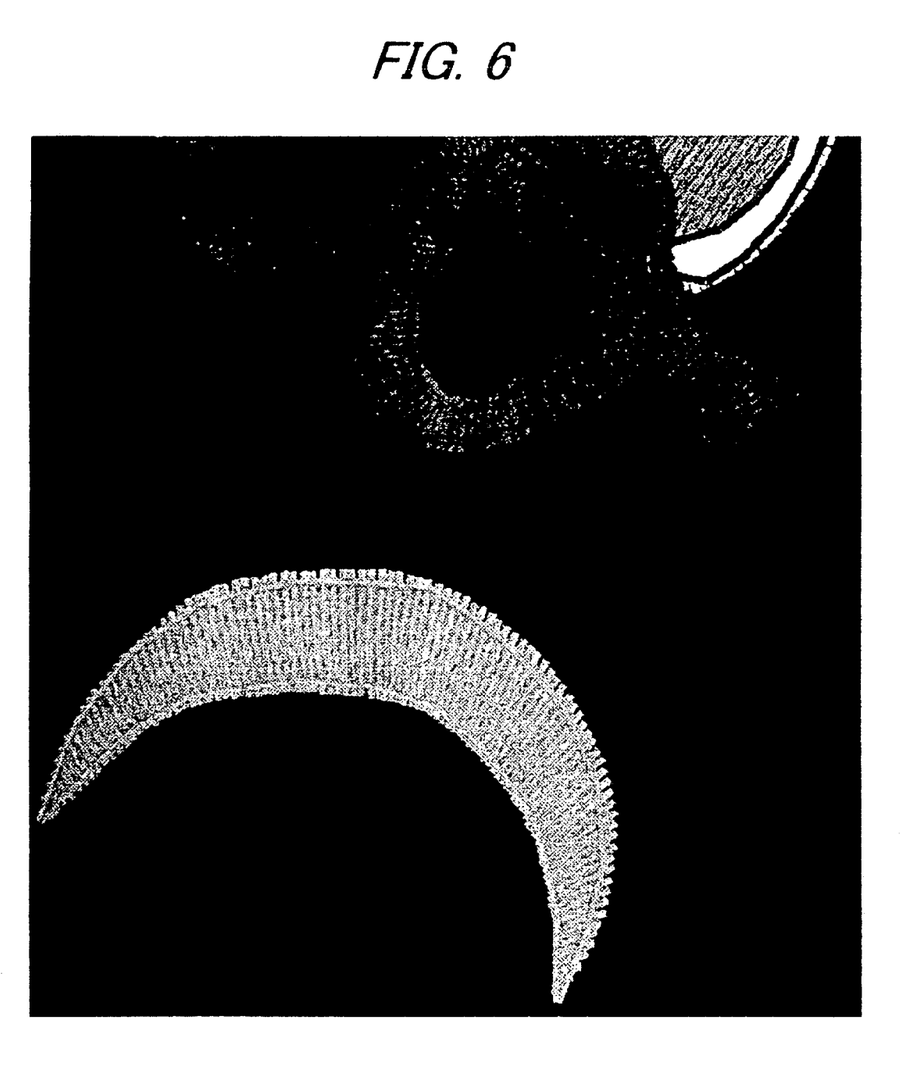
FIG. 6 shows an embroidering simulation image created without adding the brightness contrast to the stitch.

FIG. 4 shows an example of an embroidering simulation image created with application of the concepts of the invention described above. FIG. 5 and FIG. 6 show by comparison, regarding the longitudinal direction of threads for stitches, a case in which the technique of changing brightness disclosed in Japanese Patent No.2596093, is applied, and a case in which the technique of changing brightness is not applied, for the sake of contrast. More specifically, FIG. 4 is an image in which the brightness contrast is added to the simulation image shown in FIG. 6 so that one side of the stitch is bright and the other side is dark, and that the brightness changes sharply at the middle portion, and FIG. 5 is an image in which the brightness contrast is added to the image in FIG. 6 so that that both the ends of the stitch are dark and the central portion is bright. FIG. 4 according to the invention, shows a stereoscopic simulation image showing the texture better, compared with FIG. 5. In FIG. 4 to FIG. 6, in order to display stitches clearly one by one, a method for processing image data of threads as shown in FIG. 7 is used, rather than a method of adding random noise as disclosed in Japanese Patent No.2596093.

Figure 7:
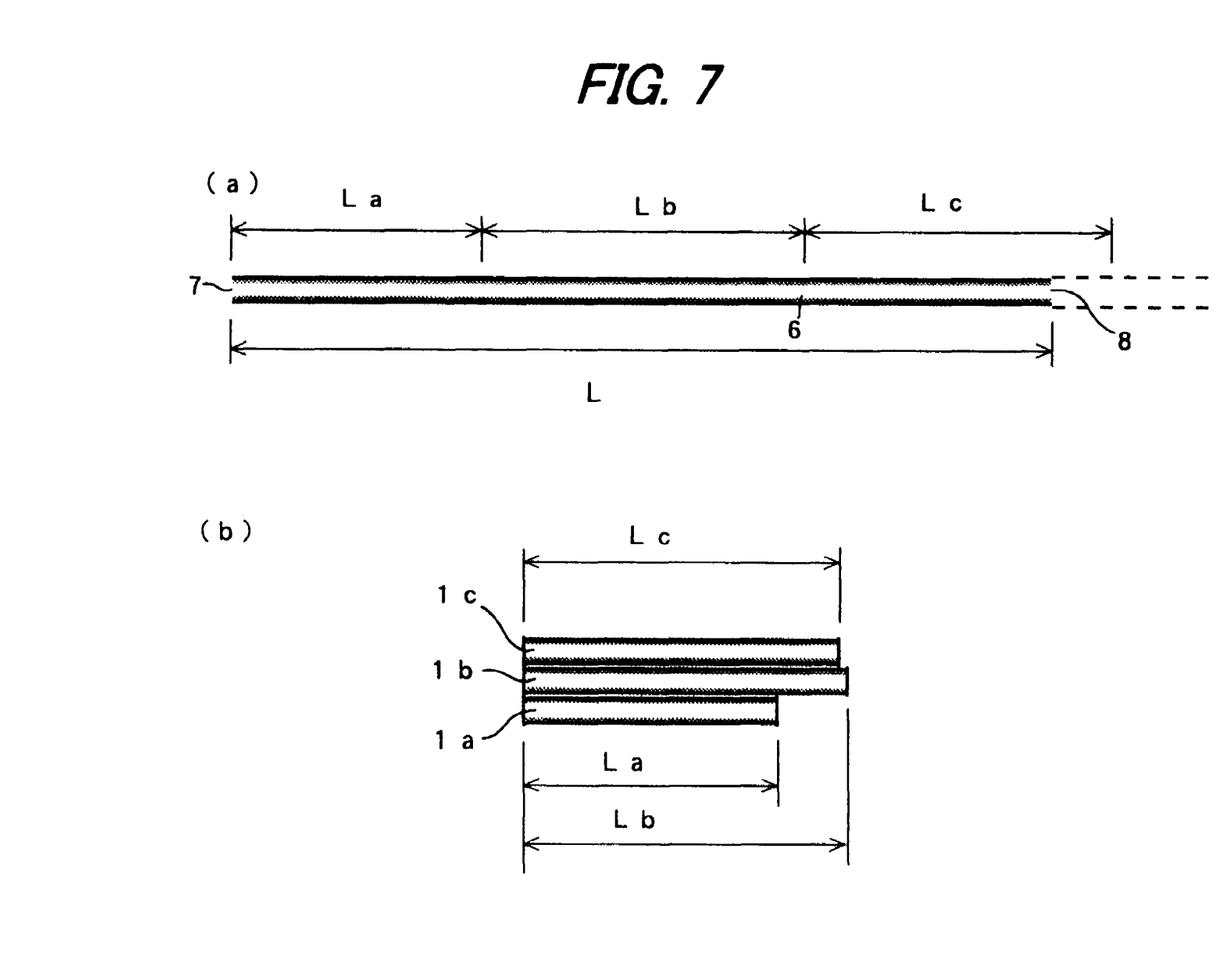
FIG. 7 shows diagrams illustrating concepts to assign thread image data to stitches according to the invention.

FIG. 7 shows a method for assigning image data of a thread 6 shown in FIG. 7(a) sequentially to stitches 1a, 1b, and 1c in an embroidery portion shown in FIG. 7(b). The length of the image data of the thread 6 is denoted by L, and the length of the stitches 1a, 1b, and 1c are denoted by La, Lb, and Lc respectively. A portion with a length of La of the image data of the thread 6 is assigned to an image of the stitch 1a. A portion starting from an end portion 7 with a length of Lb of the image data of the thread 6 is assigned to the stitch 1b. A portion with a length of Lc of the image data of the thread 6 is assigned to the stitch 1c. However, when La+Lb<L, and La+Lb+Lc>L are satisfied, for the image data of the thread 6 that is to be assigned to the stitch 1c with a length of Lc, that data of the thread 6 up to the other end portion 8 is assigned, and then a portion starting from the end portion 7 is again assigned with a length of the shortage.

In the case of using a photographic data as the image data of the thread 6, the central portion in the width direction of the thread 6 becomes comparatively bright, and both the ends or one end become comparatively dark, in accordance with the light projecting direction when the image is taken. Changes appear also in the longitudinal direction, which makes it easy to differentiate the stitches even when the stitches 1a, 1b, and 1c are arranged side by side. As well as in FIG. 4, this effect is seen in FIGS. 5 and 6. When the image data of the thread 6 is created by rendering with computer graphics instead of the photographic data, it is also possible to make the rendered data close to the photographic data by adding the brightness contrast to the thread 6 in the width direction. A more stereoscopic simulation showing texture better can be performed by changing the state of the brightness contrast is added, in accordance with the angle formed between the light projecting direction and the width direction of the thread 6, as well as in the case of the longitudinal direction of the thread 6.

Figure 8:
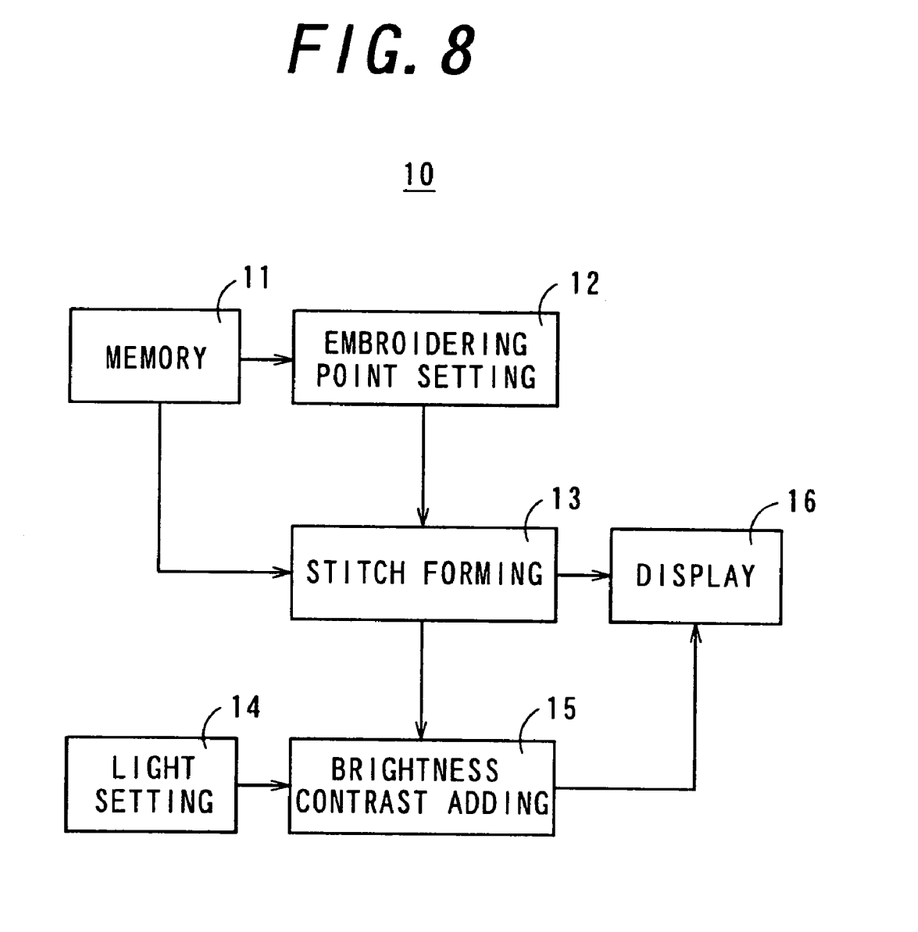
FIG. 8 shows a block diagram illustrating a functional structure of an embroidering simulation apparatus 10 as an embodiment of the invention.

FIG. 8 shows a schematic functional structure of an embroidering simulation apparatus 10 as an embodiment of the invention. In order to input embroidering data and to output an image of completed embroidery, the embroidering simulation apparatus 10 includes memory means 11, embroidering point setting means 12, stitch forming means 13, light setting means 14, brightness contrast adding means 15, and display means 16. Embroidering data is stored in the memory means 11 in advance. The embroidering point setting means 12 sets a plurality of positions of embroidering points on a virtual two-dimensional plane, based on the embroidering data stored in the memory means 11. The stitch forming means 13 forms a plurality of stitches with images of threads based on the embroidering data stored in the memory means 11 so that stitches are formed between the positions of embroidering points set by the embroidering point setting means 12.

In this embodiment, the light setting means 14 sets a light projecting direction to one direction on the virtual two-dimensional plane on which the positions of embroidering points are set. The brightness contrast adding means 15 adds brightness contrast to an image of thread for each stitch formed by the stitch forming means 13 so that end portions at the side facing the light projecting direction set by the light setting means 15 are bright, and the end portions at the other side are dark in the longitudinal direction and in the width direction. The display means 16 displays a simulation result of the embroidery by displaying an image of the two-dimensional plane provided with a plurality of stitches that are formed by the stitch forming means 13, and to which the brightness contrast is added by the brightness contrast adding means 15.

Figure 9:
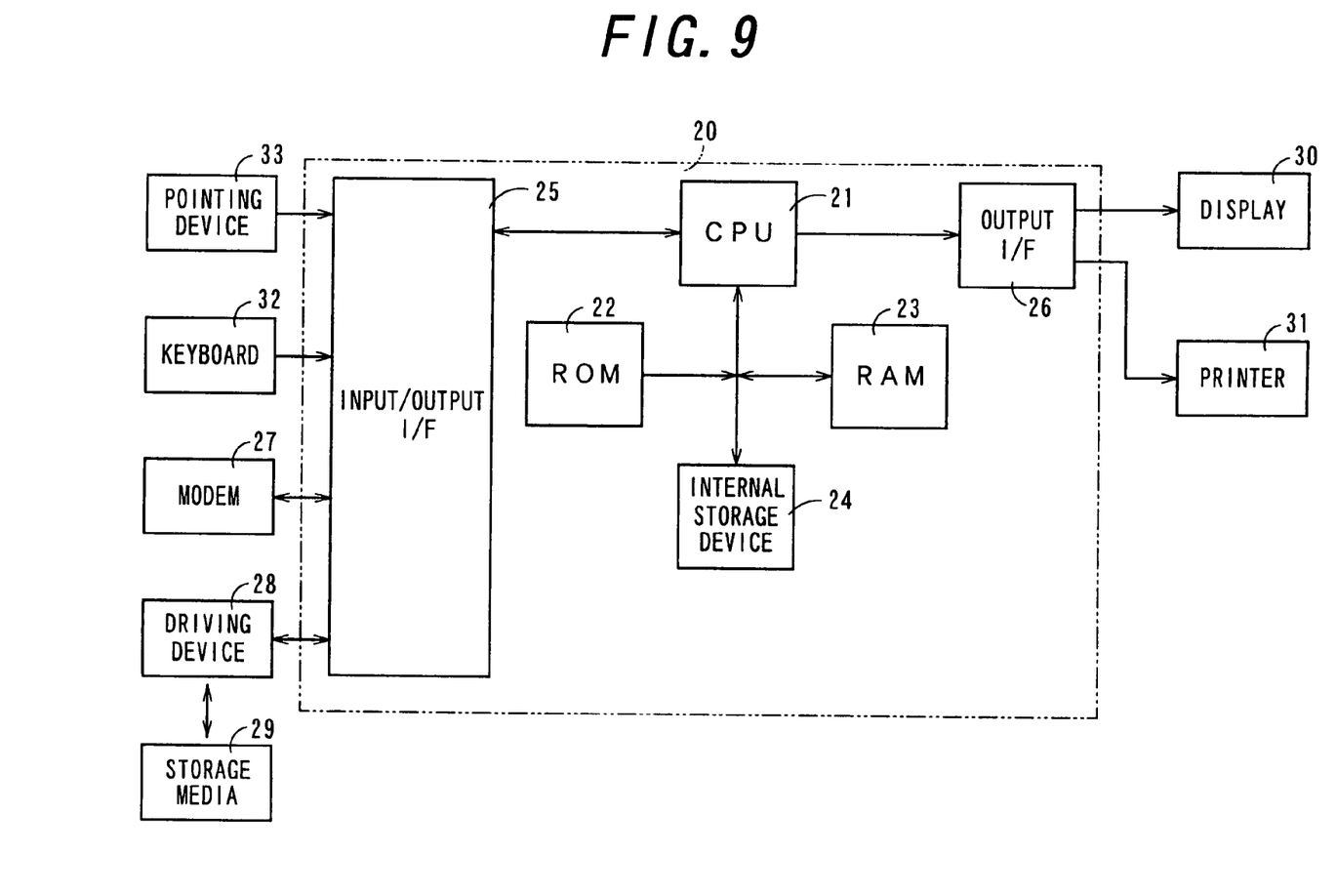
FIG. 9 shows a block diagram illustrating a schematic electric structure of a computer 20 that can carry out a programmed operation as the embroidering simulation apparatus 10 in FIG. 8.

FIG. 9 shows a schematic electric structure of a computer 20 that, as the embroidering simulation apparatus 10 of this embodiment, can carry out the functions as shown in FIG. 8 by programmed operation. The computer 20 is, for example, a general-purpose information processor that is called a personal computer or a workstation, and includes a CPU 21, an ROM 22, an RAM 23, an internal storage device 24, an input/output I/F 25, an output I/F 26, a modem 27, a driving device 28, and the like. The CPU 21 controls each portion according to a program stored in the ROM 22. The CPU 21 can also read in the program into the RUM 23, to carry out the functions of the embroidering point setting means 12, the stitch forming means 13, the light setting means 14, and the brightness contrast adding means 15, of the embroidering simulation apparatus 10.

A hard disk device, for example, is used as the internal storage device 24. The program read in by RAM 23 is stored in the internal storage device 24 in advance. I/F is an abbreviation for "interface," and the modem 27, the driving device 28 and the like are connected via the input/output I/F 25 thereto. The modem 27 includes a data convert function for information communications via a public phone line. A terminal adapter or a gateway device also may be used. The program that is stored in the internal storage device 24 in advance may be downloaded from the outside through information communications At least one of storage media 29 including optical disks such as CD-ROMs and DVD-ROMs, and magnetic disks such as floppy disks can be attached/removed to/from the driving device 28. The program stored in the storage media 29 can be read in by the RAM 23 or the internal storage device 24. The internal storage device 24 and the storage media 29 serves as the memory means 11 in FIG. 8.

A display 30 serving as the display means 16 in FIG. 8 is connected via the output I/F 26. The display 30 can be realized by a liquid crystal display (LCD), a cathode ray tube (CRT), or the like. A printer 31 is also connected via the output I/F 26. The printer 31 prints the embroidering simulation image on paper or like, using, for example, an ink jet system, or an electrographic system. A keyboard 32 and a pointing device 33 are also connected via the input/output I/F 25, as an input device. An user of the embroidering simulation apparatus 10 inputs an operation command from the keyboard 32. The pointing device 33 may be a mouse, a tablet, a track ball or like, and is used for an input operation to designate locations on the display screen of the display 30.

Figure 10:
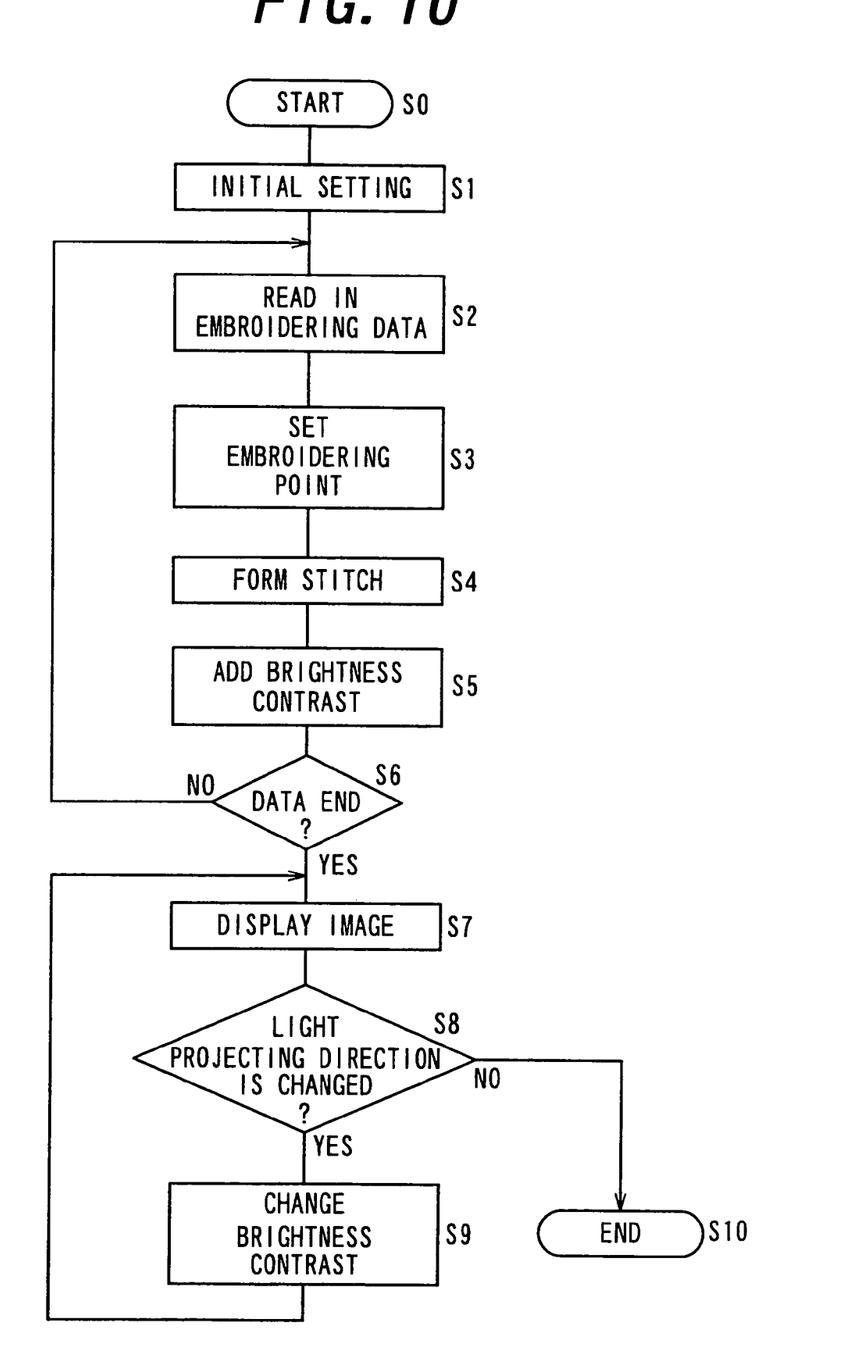
FIG. 10 shows a flow chart illustrating a schematic procedure to carry out an embroidering simulation with the embroidering simulation apparatus 10 in FIG. 8.

FIG. 10 shows a schematic procedure to carry out an embroidering simulation using the embroidering simulation apparatus 10 of this embodiment. The procedure starts in Step s0. In Step s1, various initial settings are made. The light projecting direction is set to be a default direction. In Step s2, the embroidering data that have been stored are read in. In Step s3, embroidering points are set based on the embroidering data. In Step s4, stitches are formed between the embroidering points with images of threads. In Step s5, the brightness contrast is added in the manner as described above, in accordance with the light projecting direction. More specifically, the brightness contrast is added to the image of a thread for a stitch that is formed between the positions of embroidering points set based on the embroidering data for embroidery such that one end portion on the side facing the light projecting direction is bright, the end portion on the other side is dark, with the height of the light source reflected thereon. Consequently, a stereoscopic embroidering simulation showing texture better is possible under natural light. Since a stereoscopic image can be provided by two-dimensional image processing, compared with the case of three-dimensional image processing, a calculation amount required for the image processing can be reduced, and embroidering simulation with high definition an be performed with a small amount of calculation. In Step s6, it is determined whether or not the embroidering data has ended. When it is determined that the data has not ended, the procedure goes back Step s2, where the embroidering data is continued to be read in.

In Step s6, when it is determined that the stitch formation based on the embroidering data is completed, an image is displayed in Step s7. In Step s8, it is determined whether or not the user has input an instruction to change the light projecting direction from the keyboard 32 or like. When the instruction for a change has been input, in Step s9, the brightness contrast is adjusted according to the new light projecting direction, and an image is displayed in Step s7. When the light projecting direction is changed, it is possible to confirm how the image looks depending on the difference in the light projecting direction. Since the light projecting directions can be changed, when superimposing a simulation image on another image, for example, an image of a model who is wearing an article of clothing that is to be embroidered, it becomes possible to examine the embroidery design in the following manner. The light projecting direction is set to the same as a light source direction in the image of the model, and the simulation image of the embroidery is superimposed on the image of the model without giving a sense of incongruity. The change of the light projecting direction may be also set to choose a plurality of predetermined directions. When there is no instruction to change the light projecting direction in Step s8, the procedure ends in Step s10.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

As described above, according to the invention, the brightness contrast is added to an image of a thread for a stitch formed between positions of embroidering points set based on embroidering data for embroidery so that an end portion at the side facing the light projecting direction is bright, the other end portion at the other side is dark, and that overall brightness is increased in accordance with the angle formed between the thread direction of the stitch and the light projecting direction within a range where the angle increases from 0 degree to 90 degrees. Therefore, a calculation amount required for image processing can be reduced, and an embroidering simulation with high definition can be performed with a small amount of calculation, compared with the case of three-dimensional image processing. Furthermore, brightness contrast is added to each of the thread stitch images so that a change at the central portion of the thread stitch images is bigger than a change at both sides thereof. Therefore, the simulation can provide a more stereoscopic image as embroidery formed by assembling stitches.

Furthermore, according to the invention, for an embroidering simulation by inputting embroidering data for embroidery and outputting an image of completed embroidery, a plurality of embroidering point portions are set on a two-dimensional plane based on embroidering data by embroidering point setting means, a plurality of stitches with two-dimensional images of threads based on the embroidering data are formed stitch forming means forms so that the stitches are formed between the positions of embroidering points, and a light projecting direction is set to one direction on the two-dimensional plane by light setting means. Brightness contrast adding means adds brightness contrast to each of the thread stitch images formed by the stitch forming means so that an end portion at the side facing the light projecting direction is bright, another end portion at the other side is dark, and the overall brightness is increased in accordance with the angle formed between the thread direction of the stitch and the light projecting direction within a range where the angle increases from 0 degree to 90 degrees. Consequently, a stereoscopic embroidering simulation showing texture better is possible under natural light, and embroidery simulation with high definition can be performed by two-dimensional image processing with a small amount of calculation.

Furthermore, brightness contrast is added so that a change at the central portion of the thread stitch images is bigger than a change at both sides thereof. Therefore, the simulation can provide a more stereoscopic image as embroidery formed by assembling stitches.

According to the invention, light is projected from a space above the two-dimensional plane on which stitches are present, so that the stitch can provide a natural stereoscopic image. By changing the light projecting directions, it is possible to confirm how the image looks depending on the difference in the light projecting direction. Since the light projecting directions can be changed, when superimposing a simulation image on another image, for example, an image of a model who is wearing an article of clothing that is to be embroidered, it becomes possible to examine the embroidery design in the following manner. The light projecting direction is set to the same as a light source direction in the image of the model, and the simulation image of the embroidery is superimposed on the image of the model without giving a sense of incongruity.

According to the invention, the stitch forming means includes thread image storing means for storing the image data of threads that have been acquired in advance, and thread image circulation means for assigning the image data by circulation such that the image data of threads stored by the thread image storing means is assigned sequentially to each stitch by a length of a thread of the stitch, and when the image data of the thread to be assigned reaches the termination end of the length, then assignment is started again by returning to a front end portion of the length. Therefore, stitches can be naturally displayed differently from the adjacent stitches side, as long as the length or the image of the thread prepared as the image data for the length is appropriate. The image data of the thread can be prepared easily by taking an image of a real thread for embroidery or by rendering with computer graphics.

According to the invention, a computer can function as an embroidering simulation apparatus described above.

Furthermore, according to the invention, a computer can function as an embroidering simulation apparatus described above by reading in a stored program.

The invention claimed is:

1. An embroidering simulation method including inputting embroidering data for embroidery and outputting an image of completed embroidery, comprising:
    setting a plurality of positions of embroidering points on a two-dimensional plane based on the embroidering data;
    forming a plurality of stitches between the positions of embroidering points with two-dimensional images of threads;
    setting a light projecting direction to one direction on the two-dimensional plane; and
    adding brightness contrast to each of the thread stitch images so that an end portion at one side of the thread stitch image facing the light projecting direction is bright, another end portion at the other side thereof is dark, a change at the central portion of the thread stitch images is bigger than a change at both sides thereof and overall brightness is increased in accordance with an angle formed between a thread direction of the stitch and the light projecting direction within a range where the angle increases from 0 degree to 90 degrees.

2. An embroidering simulation apparatus in which embroidering data f or embroidery is inputted and an image of completed embroidery is outputted, comprising:
    embroidering point setting means for setting a plurality of positions of embroidering points on a two-dimensional plane based on the embroidering data;
    stitch forming means for forming a plurality of stitches with two-dimensional images of threads based on the embroidering data so that the stitches are formed between the positions of embroidering points;
    light setting means for setting a light projecting direction to one direction on the two-dimensional plane; and
    brightness contrast adding means for adding brightness contrast to each of the thread stitch images so that an end portion at one side of the thread stitch image facing the light projecting direction is bright, another end portion at the other side thereof is dark, a change at the central portion of the thread stitch images is bigger than a change at both sides thereof and overall brightness is increased in accordance with an angle formed between a thread direction and the light projecting direction within a range where the angle increases from 0 degree to 90 degrees.

3. The embroidering simulation apparatus of claim 2, wherein the brightness contrast adding means adds the brightness contrast to each of the thread stitch images in accordance with the light projecting direction both in the longitudinal direction and in the width direction.

4. The embroidering simulation apparatus of claim 3, wherein the stitch forming means includes:
    thread image storing means for storing image data of threads that have been acquired in advance; and
    thread image circulation means for assigning the image data by circulation such that the image data of threads stored by the thread image storing means is assigned sequentially to each stitch by a length of the thread of the stitch, and when the image data of a thread to be assigned reaches a termination end of the length, then assignment is started again by returning to a front end portion of the length.

5. The embroidering simulation apparatus of claim 2, wherein the stitch forming means includes:
    thread image storing means for storing image data of threads that have been acquired in advance; and
    thread image circulation means for assigning the image data by circulation such that the image data of threads stored by the thread image storing means is assigned sequentially to each stitch by a length of the thread of the stitch, and when the image data of a thread to be assigned reaches a termination end of the length, then assignment is started again by returning to a front end portion of the length.

6. A computer-readable storage medium on which a program to be read by a computer to let the computer function as the embroidering simulation apparatus of claim 2 is stored.

7. A computer-readable storage medium on which a program to be read by a computer to let the computer function as the embroidering simulation apparatus of claim 3 is stored.

8. A computer-readable storage medium including a program, which when read by a computer, is adapted to perform the method of claim 1.

9. An apparatus including a display and a control device, adapted to perform the method of claim 1.

10. An embroidering simulation apparatus, comprising:
    a first device, adapted to set a plurality of embroidering point positions on a two-dimensional plane based on the input data and form a plurality of stitches with two-dimensional images of threads based on the input data, the stitches being formed between the embroidering points positions; and
    a second device, adapted to set a light projecting direction to one direction on the two-dimensional plane and adapted to add brightness contrast to each of the thread stitch images so that an end portion at one side of the thread stitch image is bright, another end portion at the other side thereof is dark, a change at the central portion of the thread stitch images is relatively larger than a change at both sides thereof.

11. The embroidering simulation apparatus of claim 10, wherein overall brightness is increased in accordance with an angle formed between a thread direction and the light projecting direction within a range of 0 degree to 90 degrees.

* * * * *